No. 775,785. Patented November 22, 1904.

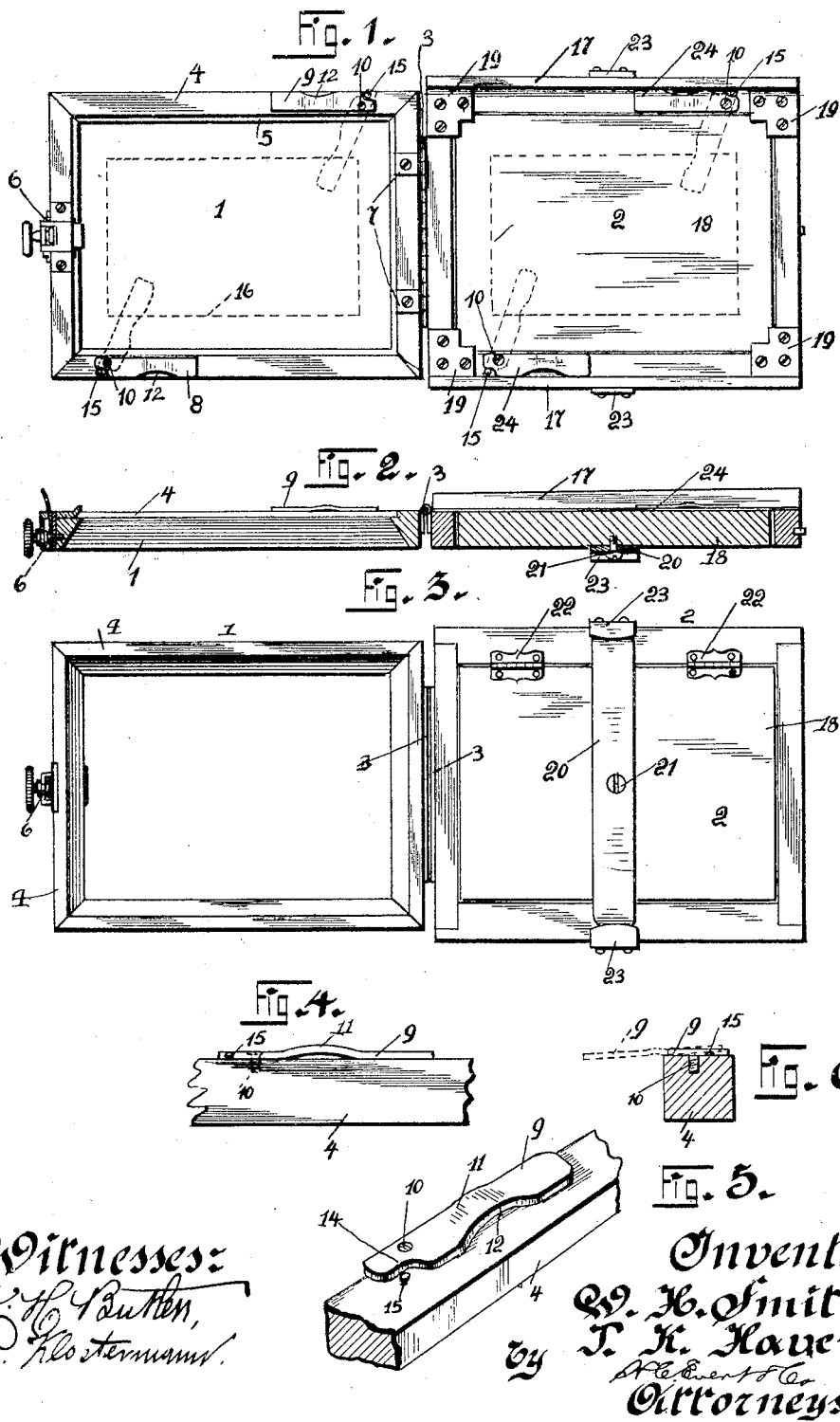

UNITED STATES PATENT OFFICE.

WILLIAM H. SMITH AND TITUS K. HAUER, OF PITTSBURG, PENNSYLVANIA.

PHOTOGRAPHIC-PRINTING FRAME.

SPECIFICATION forming part of Letters Patent No. 775,785, dated November 22, 1904.

Application filed July 28, 1904. Serial No. 218,495. (No model.)

*To all whom it may concern:*

Be it known that we, WILLIAM H. SMITH and TITUS K. HAUER, citizens of the United States of America, residing at Pittsburg, in the county of Allegheny and State of Pennsylvania, have invented certain new and useful Improvements in Photographic-Printing Frames, of which the following is a specification, reference being had therein to the accompanying drawings.

This invention has relation to photographic-printing frames; and the invention has for its object to provide novel means for supporting a negative within the frame and for retaining the printing-paper within the frame, whereby either the negative or the printing-paper may be inspected from time to time during the printing process without displacing either one.

Another object of our invention is to provide novel means for retaining a negative within a printing-frame, this negative either being a glass negative or film, and, furthermore, to provide means for holding the printing-paper within the frame, whereby the same may be inspected from time to time during the process of printing the same without displacing or ruining the picture.

Heretofore in frames of this type it has been impossible to inspect the whole printing-paper during the process of printing the same without danger of displacing or ruining the picture being printed, and it has also been impossible to print a film in the same frame in which a glass negative is printed, and we have entirely eliminated these troublesome features by constructing a frame wherein novel means is provided for retaining a glass negative within a frame, and in case a film is to be printed a plain plate of glass is employed and means for retaining the film upon the plate, whereby should the frame be inspected the film will not become displaced and ruin the picture being printed. We have also constructed novel means for retaining the printing-paper within the frame in such a manner that it will be impossible to move the same during the inspection of the picture, and in connection with the means for retaining the printing-paper within the frame we employ novel means whereby a smaller sheet of paper may be retained therein, whereby a smaller picture may be made than the size of the frame or negative.

With all the above and other objects in view the invention finally consists in the novel construction, combination, and arrangement of parts to be hereinafter more fully described, and specifically pointed out in the claims.

In describing the invention in detail reference will be had to the accompanying drawings, forming a part of this application, wherein like numerals of reference indicate like parts throughout the several views, in which—

Figure 1 is a top plan view of our improved printing-frame, showing the same in an opened position. Fig. 2 is a longitudinal sectional view of the same. Fig. 3 is an underneath plan view of the frame in an opened position. Fig. 4 is a detail view of a portion of the frame, showing one of the spring-clips. Fig. 5 is a perspective view of the same, and Fig. 6 is a cross-sectional view of a portion of the frame upon which a spring-clip is mounted.

In carrying our invention into effect we construct a frame of two sections 1 and 2, these sections being suitably hinged together, as indicated at 3, and we will first describe the section 1, which is adapted to contain the negative to be printed. This negative-holder comprises a rectangular frame which may be made of any desired dimensions, and the rails 4 of the frame are rabbeted, as indicated at 5, to receive the glass plate or negative. The reference-numerals 6 and 7 indicate the ordinary means which is commonly employed in photographic-printing frames for retaining the negative-plate within the frame, and our invention resides in providing novel means in connection with these retaining means whereby a film may be printed within the frame.

Should it be desired to print a film within the frame, a plain glass plate is inserted within the section 1 and retained therein by the means designated by the reference-numerals 6 and 7, and in order to secure a film in position upon this plate we employ the spring-clips 8 and 9. The spring-clips, one of which is illustrated in Figs. 4, 5, and 6 of the drawings, are constructed of a strip of metal which is pivoted to the rail of the frame, as designated by the reference-numeral 10, and this clip is slightly curved, as designated at 11, the one side thereof being cut away, as indicated at 12. The pivoted end of the clip has a portion of its side cut away, as indicated at 14, and the rail of the frame is provided with a pin 15, this pin being located upon the rail adjacent to the pivoted end of the clip and in alinement with an arc described by the end of the clip when the same is swung around. One of these clips, as illustrated in Figs. 4, 5, and 6 of the drawings, is employed upon each of the side rails of the frame, and to clearly illustrate the use of the clips we have shown by dotted lines 16 a film which is of a smaller size than the plate upon which it is supported, and each one of the clips are adapted to be swung outwardly to engage the film, as shown in Fig. 1 of the drawings. The clips are loosely mounted upon their pivot-points, whereby as they are swung outwardly to engage the film the rear or pivoted end of the clip will ride up the pin and force the forward end of the clip into engagement with the film, the pin 15 acting as a cam-surface for the pivoted end of the clip to travel upon, the raising of the rear end of the clip causing the forward end to firmly engage the film and securely hold the same upon the glass plate.

The section 2 of the frame is made of dimensions similar to the section 1, and the side rails are provided with upwardly-extending flanges 17 17, which are adapted to engage the section 1 of the frame. This frame is provided with a hinged door 18, and the door is adapted to close the plates within the frame of the section and form a support for the print, the print being held in a stationary position by impinging the corners of the print between the door and the L-shaped plates or strips 19. The door 18 may be provided with a cushion on its inner face, which may be composed of any suitable material—such as felt, cloth, or the like—and the upper face of the rails comprising the frame are provided with a similar material, this construction being common to printing-frames of this type. The door upon its outer face is provided with a spring-strip 20, which is pivoted to the center of the door, as designated by the reference-numeral 21, the door being hinged to one of the side rails, as indicated at 22 22, and the spring-strip 20 when the door is in a closed position is adapted to engage under the angular plates 23 23, which are secured to the side rails of the printing-frame. Upon the inner sides of these side rails are secured clips 24 24, which are similar in construction to the clip shown in Figs. 4, 5, and 6 of the drawings and described in connection with the section 1, heretofore mentioned. These clips 24 24 are employed in case it is desired to use a smaller piece of printing-paper than can be retained in the frame by the L-shaped strips or plates 19 19, and in dotted lines in Fig. 1 of the drawings we have illustrated a smaller piece of printing-paper upon which a picture is to be printed from a negative. The printing-paper is supported upon the inner face of the door by the clips 22 24, these clips being swung inwardly similar to the manner of using the clips 8 and 9, heretofore described. It will thus be seen by this construction that a smaller piece of printing-paper may be retained within the printing-frame than is commonly used, the same being true in regard to the negative which is to be printed. By constructing our improved frame in the manner described it will be possible for the frame to be opened and the condition of the printing-paper inspected without in the least displacing the same, and while we have herein shown the preferred manner of constructing our improved frame it will be observed that any desired number of clips may be employed for retaining a film or printing-paper within the frame, and other slight changes may be made as will be permissible by the appended claims.

What we claim, and desire to secure by Letters Patent, is—

1. A printing-frame comprising two sections hinged together, one of said sections being rabbeted and provided with means for holding a glass plate in position in the rabbeted portion of said section, with independent means for holding a film against said plate, the other of said sections being provided with a hinged door and with means for securing a piece of paper against the inner side of the door.

2. A printing-frame comprising two members hinged together, each of said members being in the form of a rectangular frame, one of said members being provided with means for suspending a glass plate in position therein and with swiveled spring-clips adapted to hold a film against said glass plate, the other of said members being provided with a hinged door and means for holding the door in closed position.

3. A device of the character described consisting of two rectangular frames hinged together, one of said frames being rabbeted on its inner side and provided with means for suspending a glass plate in position therein, and with swiveled spring-clips adapted to hold a film against said glass plate, the other of said members being provided with a hinged door and with swiveled spring-clips adapted to suspend a piece of paper in contact with the inner side of said door.

4. The combination with a photographic-printing frame, of spring-clips swiveled on the inner sides of the sections of the frame and pins located adjacent the pivotal points of said clips and adapted to raise one of the ends of the clips and depress the other against an object placed in the frame.

In testimony whereof we affix our signatures in the presence of two witnesses.

WILLIAM H. SMITH.
    TITUS K. HAUER.

Witnesses:
 H. C. EVERT,
 M. E. WEBBER.